Dec. 31, 1929.                M. J. HENRY                 1,741,234
                             BOLT AND NUT LOCK
                            Filed Sept. 30, 1926
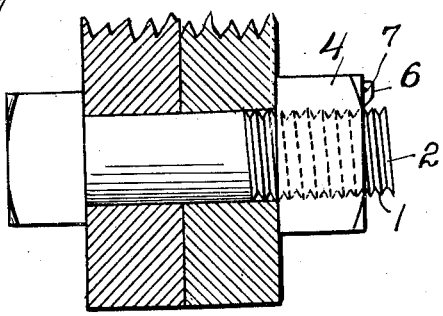
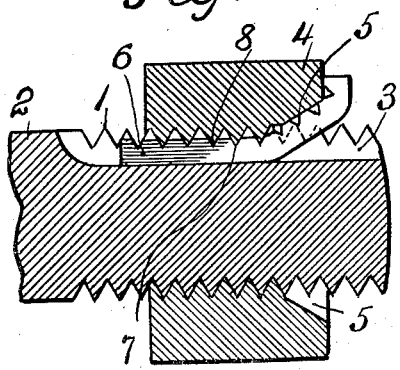
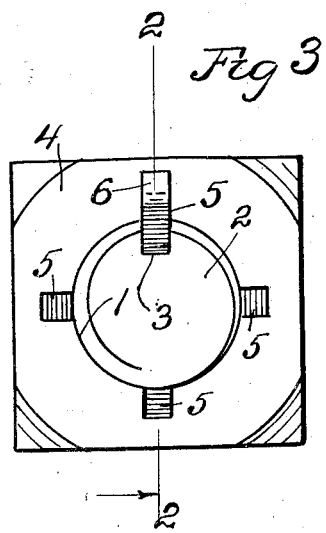
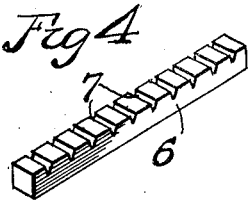
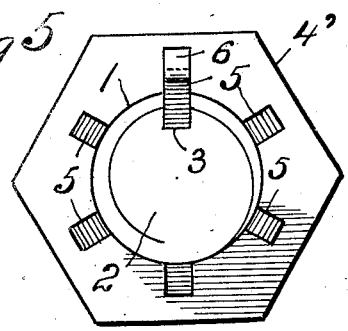
INVENTOR.
Marion J. Henry
BY Warren W. House
His ATTORNEY.
Witness:
R. E. Hamilton Patented Dec. 31, 1929

1,741,234

UNITED STATES PATENT OFFICE

MARION J. HENRY, OF FORT MADISON, IOWA

BOLT AND NUT LOCK

Application filed September 30, 1926. Serial No. 138,653.

My invention relates to improvements in bolt and nut locks.

One of the objects of my invention is to provide a novel bolt and nut lock, which is simple, cheap, durable, easily operated, and reliable in operation.

The novel features of my invention are hereinafter fully described and claimed.

In the accompanying drawing, which illustrates the preferred embodiment of my invention, Fig. 1 is a view, partly in section and partly in elevation, showing my improved bolt and nut lock operatively employed.

Fig. 2 is an enlarged section on the line 2—2 of Fig. 3.

Fig. 3 is an end elevation of a bolt and nut provided with my improvement.

Fig. 4 is a perspective view of the locking pin.

Fig. 5 is an end elevation of a bolt and hexagonal nut provided with my improvement.

Similar reference characters designate similar parts in the different views.

The threaded portion 1 of a bolt 2 is provided with a longitudinal groove 3. 4 designates a square nut fitted to the bolt 2 and having in its outer end one or more grooves which extend laterally from the hole in the nut, and which, preferably, are oblique and incline outwardly from the hole in the nut, and are designated by 5. The grooves 5 are equally spaced and circularly arranged.

6 designates a locking pin, Fig. 4, which is adapted to be fitted in the groove 3 of the bolt, and which has in its outer side one or more transverse grooves 7 adapted to receive the thread 8 of the nut 4 when the latter is mounted on the bolt 2. Preferably a row of transverse grooves 7, equally spaced so as to respectively register with the convolutions of the thread in the nut, are employed. The projections between the grooves 7 on the outer side of the locking pin 6 form teeth of less depth than the depth of the threads 8 of the nut, Fig. 2, which engage the thread 8 of the nut, and the pin is thereby held from longitudinal movement in the groove 3. By having the teeth of the pin of less depth than the depth of the threads 8 of the nut, but otherwise fitting between said threads, spaces are provided, for the catching of dirt, between the teeth and the bottom of the groove between the threads of the nut, thus enabling the nut to be easily screwed onto the bolt when the pin is in the groove thereof, which could not be done with the teeth of the pin fully fitting between the threads of the nut, were the threads dirty, as might be the case.

Before the nut 4 is applied to the bolt 2, the straight locking pin 6 is inserted in the groove 3, with its grooved side out and with its outer end projecting slightly beyond the end of the bolt 2. The nut is then screwed onto the bolt and pin 6 to its proper operative position in which it is to be locked. The nut is left positioned with one of the oblique grooves in register with the groove 3 in the bolt. The outer end portion of the locking pin 6 is then flexed so as to enter the adjacent groove 5, thereby holding the nut 4 from turning on the bolt 2.

The outer side of the pin 6 is located within the peripheries of the convolutions of the bolt thread, as shown in Fig. 2.

When it is desired to remove the nut 4 from the bolt 2, it is but necessary, to release the nut, to bend the pin 6 back to its original straight form, thereby permitting turning of the nut.

By having the lateral grooves 5 oblique, the bend in the pin 6 is not abrupt, and the pin is not greatly weakened by the rebending, so that it may be used many times before breaking, if made of suitably flexible material, such as wrought iron or soft steel.

In Fig. 3 is shown a square nut provided with the grooves 5, and in Fig. 5 an hexagonal nut 4' is provided with six of the grooves 5.

I do not limit my invention to the structures shown and described, as modifications, within the scope of the appended claim, may be made without departing from the spirit of my invention.

What I claim is:—

In a bolt and nut lock, a bolt having a threaded portion with a longitudinal groove therein, a flexible locking pin adapted to be fitted in said groove having in its outer side before its insertion in the groove, threads aligning with the threads of the bolt, and a nut fitted to said bolt and having means for engaging said pin to hold the latter from turning when the pin is bent away from the bolt, the threads of said pin being of less depth than the threads of the bolt and nut, and being spaced at their outer edges from the bottoms of the threads in the nut, when the latter is screwed tightly onto the bolt and pin.

In testimony whereof I have signed my name to this specification.

MARION J. HENRY.